(12) United States Patent
Nakayama

(10) Patent No.: US 12,510,585 B2
(45) Date of Patent: Dec. 30, 2025

(54) TEST DEVICE AND TEMPERATURE CONTROL METHOD WITH TEMPERATURE SENSORS

(71) Applicant: Tokyo Electron Limited, Tokyo (JP)

(72) Inventor: Hiroyuki Nakayama, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 195 days.

(21) Appl. No.: 18/546,832

(22) PCT Filed: Feb. 14, 2022

(86) PCT No.: PCT/JP2022/005730
§ 371 (c)(1),
(2) Date: Aug. 17, 2023

(87) PCT Pub. No.: WO2022/181377
PCT Pub. Date: Sep. 1, 2022

(65) Prior Publication Data
US 2024/0125843 A1 Apr. 18, 2024

(30) Foreign Application Priority Data
Feb. 26, 2021 (JP) .................. 2021-029656

(51) Int. Cl.
*G01R 31/28* (2006.01)
(52) U.S. Cl.
CPC ...... *G01R 31/2849* (2013.01); *G01R 31/2831* (2013.01)

(58) Field of Classification Search
CPC ............ G01R 31/2831; G01R 31/2849; G01R 31/2874; G01R 31/2875; G01R 31/2877; G05D 23/19; G05D 23/24
See application file for complete search history.

(56) References Cited

U.S. PATENT DOCUMENTS

| 6,111,421 | A * | 8/2000 | Takahashi | G01R 31/2887 324/750.04 |
| 6,866,094 | B2 * | 3/2005 | Cousineau | F25B 41/20 324/750.08 |
| 11,199,575 | B2 * | 12/2021 | Fujihara | G01R 31/2887 |
| 11,249,132 | B2 * | 2/2022 | Fujihara | G01R 31/2875 |
| 2020/0411339 | A1 * | 12/2020 | Endo | F27D 5/0037 |
| 2021/0156890 | A1 * | 5/2021 | Kobayashi | G01R 31/2831 |

(Continued)

FOREIGN PATENT DOCUMENTS

| JP | 2004-502918 | 1/2004 |
| JP | 2007-165675 | 6/2007 |
| JP | 2016-180680 | 10/2016 |

(Continued)

*Primary Examiner* — Vinh P Nguyen
(74) *Attorney, Agent, or Firm* — IPUSA, PLLC

(57) ABSTRACT

A test device according to one aspect of the present disclosure includes a stage configured to mount a substrate, a first temperature sensor configured to measure a surface temperature of the stage and a temperature of the substrate mounted on the stage, a second temperature sensor for controlling a temperature of the stage, and a controller configured to control the temperature of the stage by offsetting a control temperature of the second temperature sensor based on the surface temperature of the stage and the temperature of the substrate that are measured by the first temperature sensor.

6 Claims, 7 Drawing Sheets

(56) References Cited

U.S. PATENT DOCUMENTS

2022/0316953 A1 * 10/2022 Yamasaki .............. G01K 1/026

FOREIGN PATENT DOCUMENTS

| JP | 2018-195725 | 12/2018 |
| JP | 2020-096152 | 6/2020 |
| JP | 2020-198414 | 12/2020 |
| JP | 2021-009769 | 1/2021 |
| KR | 10-2021-0001956 | 1/2021 |

* cited by examiner

FIG.6

| | TEMPERATURE [°C] | POSITION [X,Y] | OFFSET AMOUNT [°C] |
|---|---|---|---|
| SUBSTRATE $W_1$ | 85 | $X_1, Y_1$ | +1.0 |
| | 85 | $X_1, Y_2$ | +1.1 |
| | .. | .. | .. |
| | 85 | $X_m, Y_n$ | +1.3 |
| SUBSTRATE $W_2$ | 95 | $X_1, Y_1$ | +1.5 |
| | .. | .. | .. |
| SUBSTRATE $W_M$ | | | |

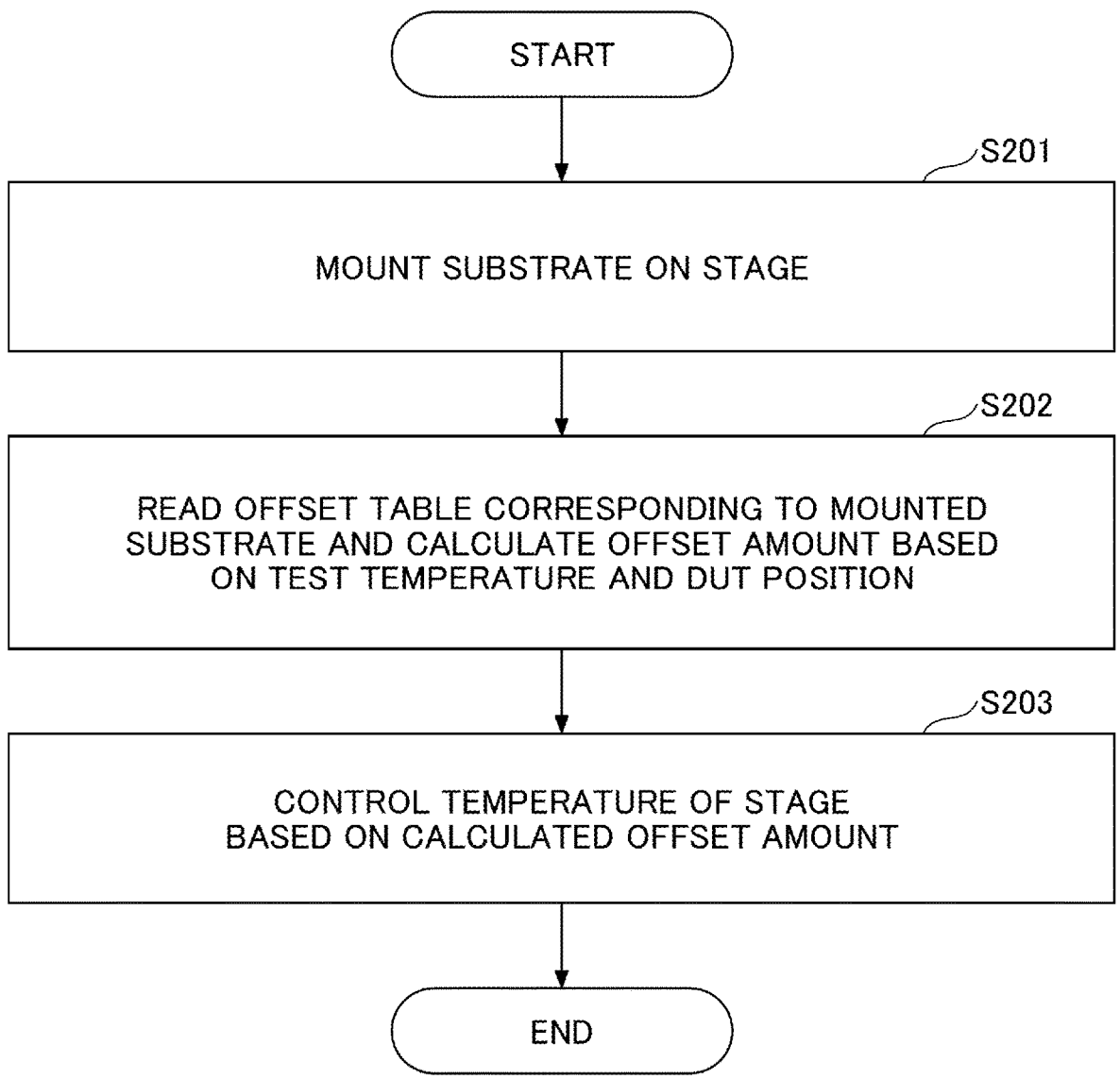
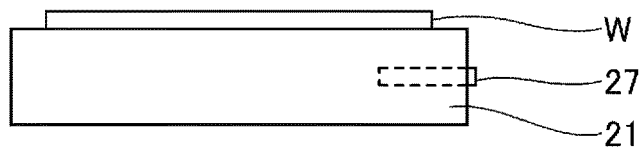

TEST DEVICE AND TEMPERATURE CONTROL METHOD WITH TEMPERATURE SENSORS

TECHNICAL FIELD

The present disclosure relates to a test device and a temperature control method.

BACKGROUND

A test device that includes a heating mechanism including a heating source for heating a temperature control target, a cooling mechanism including a cooling source for cooling the temperature control target, and a temperature controller configured to control the heating source and the cooling source is known (for example, see Patent Document 1).

CITATION LIST

Patent Document

[Patent Document 1] Japanese Laid-open Patent Application Publication No. 2020-096152

SUMMARY

Problem to be Solved by the Invention

The present disclosure provides a technique that can control the temperature of a substrate to be tested with high accuracy.

Means for Solving Problem

A test device according to one aspect of the present disclosure includes a stage configured to mount a substrate, a first temperature sensor configured to measure a surface temperature of the stage and a temperature of the substrate mounted on the stage, a second temperature sensor for controlling a temperature of the stage, and a controller configured to control the temperature of the stage by offsetting a control temperature of the second temperature sensor based on the surface temperature of the stage and the temperature of the substrate that are measured by the first temperature sensor.

Effect of Invention

According to the present disclosure, the temperature of a substrate to be tested can be controlled with high accuracy.

BRIEF DESCRIPTION OF THE DRAWINGS

FIG. 6 is a diagram illustrating an example of an offset table.

FIG. 7 is a flowchart illustrating an example of a temperature control process.

FIG. 8 is a diagram illustrating an example of the temperature control process.

DESCRIPTION OF EMBODIMENTS

In the following, non-restrictive exemplary embodiments of the present disclosure will be described with reference to the accompanying drawings. In all of the accompanying drawings, the same or corresponding members or components are denoted by the same or corresponding reference symbols, and duplicated description is omitted.

[Test Device]

Figure 1:
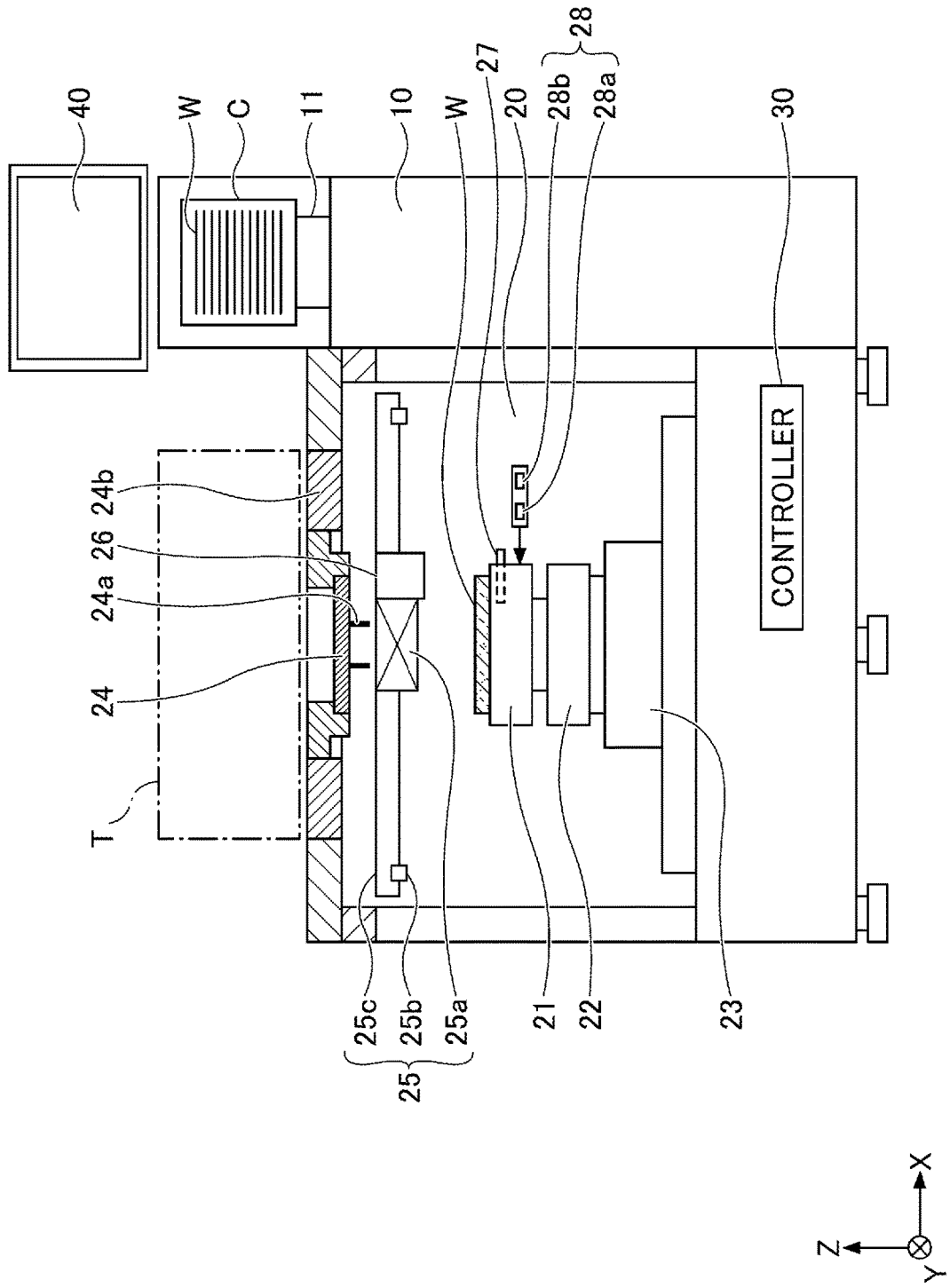
FIG. 1 is a diagram illustrating an example of a test device according to an embodiment.
Figure 2:
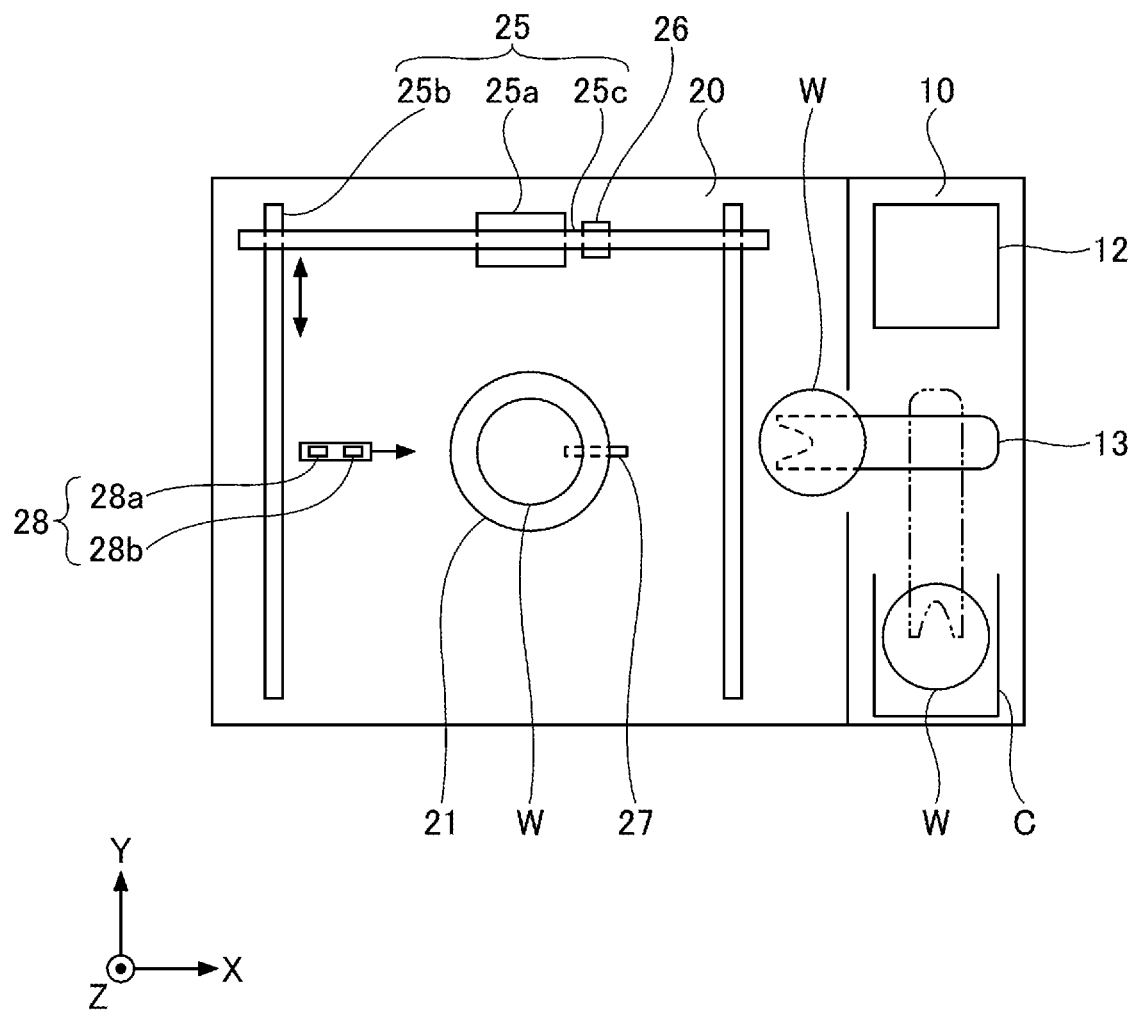
FIG. 2 is a plan view of the test device of FIG. 1.
Figure 3:
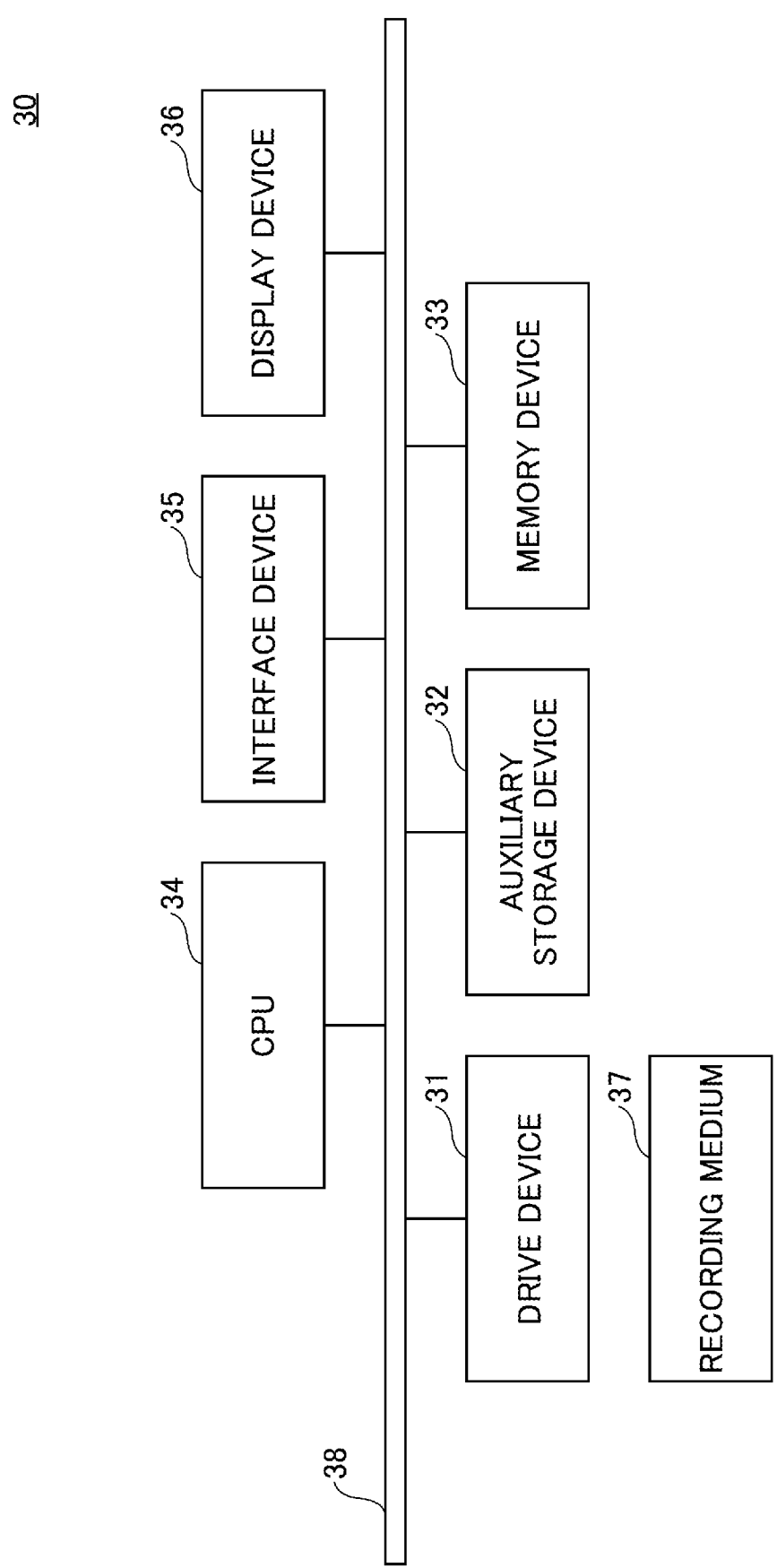
FIG. 3 is a diagram illustrating an example of a hardware configuration of a controller.

An example of a test device according to an embodiment will be described with reference to FIGS. 1 to 3.

A test device 1 is a device that can test a substrate W. The test device 1 includes a loader 10, a test section 20, and a controller 30. Under the control of the controller 30, the test device 1 transfers the substrate W to be tested from the loader 10 to the test section 20, and applies an electrical signal to a device under test (DUT) formed on the substrate W to test various electrical characteristics. The substrate W may be, for example, a semiconductor wafer.

The loader 10 includes a load port 11, an aligner 12, and a substrate transfer mechanism 13. A cassette C accommodating the substrate W is mounted on the load port 11. The aligner 12 aligns the substrate W. The substrate transfer mechanism 13 transfers the substrate W between the cassette C mounted on the load port 11, the aligner 12, and a stage 21, which will be described later. In the loader 10, first, the substrate transfer mechanism 13 transfers the substrate W accommodated in the cassette C to the aligner 12. Subsequently, the aligner 12 aligns the substrate W. Subsequently, the substrate transfer mechanism 13 transfers the aligned substrate W from the aligner 12 to the stage 21 provided in the test section 20.

The test section 20 is disposed adjacent to the loader 10. The test section 20 includes the stage 21, a raising/lowering mechanism 22, an XY stage 23, a probe card 24, an alignment mechanism 25, a contact temperature sensor 26, a control temperature sensor 27, and a temperature adjustment mechanism 28.

The stage 21 has a mounting surface. The substrate W is mounted on the mounting surface (the surface) of the stage 21. The stage 21 includes, for example, a vacuum chuck.

The raising/lowering mechanism 22 is provided below the stage 21 and raises and lowers the stage 21 with respect to the XY stage 23. The raising/lowering mechanism 22 includes, for example, a stepping motor.

The XY stage 23 is provided below the raising/lowering mechanism 22 and moves the stage 21 and the raising/lowering mechanism 22 in two axial directions (in the X direction and the Y direction in the drawing). The XY stage 23 is fixed to a bottom of the test section 20. The XY stage 23 includes, for example, a stepping motor.

The probe card 24 is disposed above the stage 21. Multiple probes 24a are formed on the stage 21 side of the probe card 24. The probe card 24 is detachably attached to a head plate 24b. A tester (not illustrated) is connected to the probe card 24 via a test head T.

The alignment mechanism 25 includes a camera 25a, a guide rail 25b, and an alignment bridge 25c. The camera 25a is attached to the center of the alignment bridge 25c so as to face downward and captures images of the stage 21, the substrate W, and the like. The camera 25a is, for example, a CCD camera or a CMOS camera. The guide rail 25b supports the alignment bridge 25c so as to be movable in the horizontal direction (in the Y direction in the drawing). The alignment bridge 25c is supported by the pair of left and right guide rails 25b and moves in the horizontal direction (in the Y direction in the drawing) along the guide rails 25b. With this configuration, the camera 25a moves between a standby position and a position directly below the center of the probe card 24 (hereinafter referred to as a "probe center") via the alignment bridge 25c. During alignment, the camera 25a located at the probe center captures an image of an electrode pad of the substrate W on the stage 21 from above while the stage 21 moves in the XY directions, performs image processing, and displays the captured image on the display device 40.

The contact temperature sensor 26 is attached to the alignment bridge 25c so as to be adjacent to the camera 25a such that a temperature measuring section that measures the temperature faces downward, and measures the surface temperature of the stage 21 and the surface temperature of the substrate W mounted on the stage 21. The contact temperature sensor 26 is a temperature sensor using, for example, a thermocouple or a platinum resistance thermometer. When the contact temperature sensor 26 measures the surface temperature of the stage 21, the raising/lowering mechanism 22 raises the stage 21 to cause the temperature measuring section of the contact temperature sensor 26 to contact the surface of the stage 21. Additionally, when the contact temperature sensor 26 measures the surface temperature of the substrate W mounted on the stage 21, the raising/lowering mechanism 22 raises the stage 21 to cause the temperature measuring section of the contact temperature sensor 26 to contact the surface of the substrate W.

The control temperature sensor 27 is embedded inside the stage 21 and is a temperature sensor for controlling the temperature of the stage 21 when the substrate W to be tested is tested in the test device 1. The control temperature sensor 27 is a temperature sensor using, for example, a thermocouple or a platinum temperature measuring resistor.

The temperature adjustment mechanism 28 includes a heating mechanism 28a and a cooling mechanism 28b. The temperature adjustment mechanism 28 adjusts the temperature of the stage 21 by the heating of the heating mechanism 28a and the cooling of the cooling mechanism 28b. The heating mechanism 28a may be, for example, a heater. The cooling mechanism 28b may be, for example, a chiller. The temperature adjustment mechanism 28 adjusts the temperature of the stage 21 according to a signal from the controller 30.

The controller 30 is provided below the stage 21 and controls the overall operation of the test device 1. As illustrated in FIG. 3, the controller 30 is a computer including a drive device 31, an auxiliary storage device 32, a memory device 33, a CPU 34, an interface device 35, a display device 36, and the like, which are connected to each other via a bus 38.

A program implementing the processing in the controller 30 is provided by a recording medium 37 such as a CD-ROM. When the recording medium 37 storing the program is set in the drive device 31, the program is installed in the auxiliary storage device 32 from the recording medium 37 via the drive device 31. However, it is not necessarily required to install the program from the recording medium 37, and the program may be downloaded from another computer via a network.

The auxiliary storage device 32 stores the installed program and necessary information such as an offset table, which will be described later. The memory device 33 reads the program from the auxiliary storage device 32 and stores the program when a program activation instruction is issued. The CPU 34 executes functions related to the test device 1 in accordance with the program stored in the memory device 33. The interface device 35 is used as an interface for connecting to a network. The display device 36 displays various kinds of information and also functions as an operating unit that receives an operation from an operator.

In the test device 1, first, the controller 30 controls the temperature adjustment mechanism 28 based on the temperature of the stage 21 that is measured by the control temperature sensor 27 to adjust the temperature of the stage 21 to a test temperature. Subsequently, the alignment mechanism 25 aligns the electrode pads of the device to be tested formed on the substrate W mounted on the stage 21 with the multiple probes 24a of the probe card 24. Subsequently, the raising/lowering mechanism 22 raises the stage 21 to cause the multiple probes 24a of the probe card 24 to contact the corresponding electrode pads. Subsequently, the controller 30 applies a test signal from the tester to the device to be tested formed on the substrate W, via the test head T and the multiple probes 24a of the probe card 24, to test the electrical characteristics of the device to be tested.

[Offset Table Generation Process]

Figure 4:
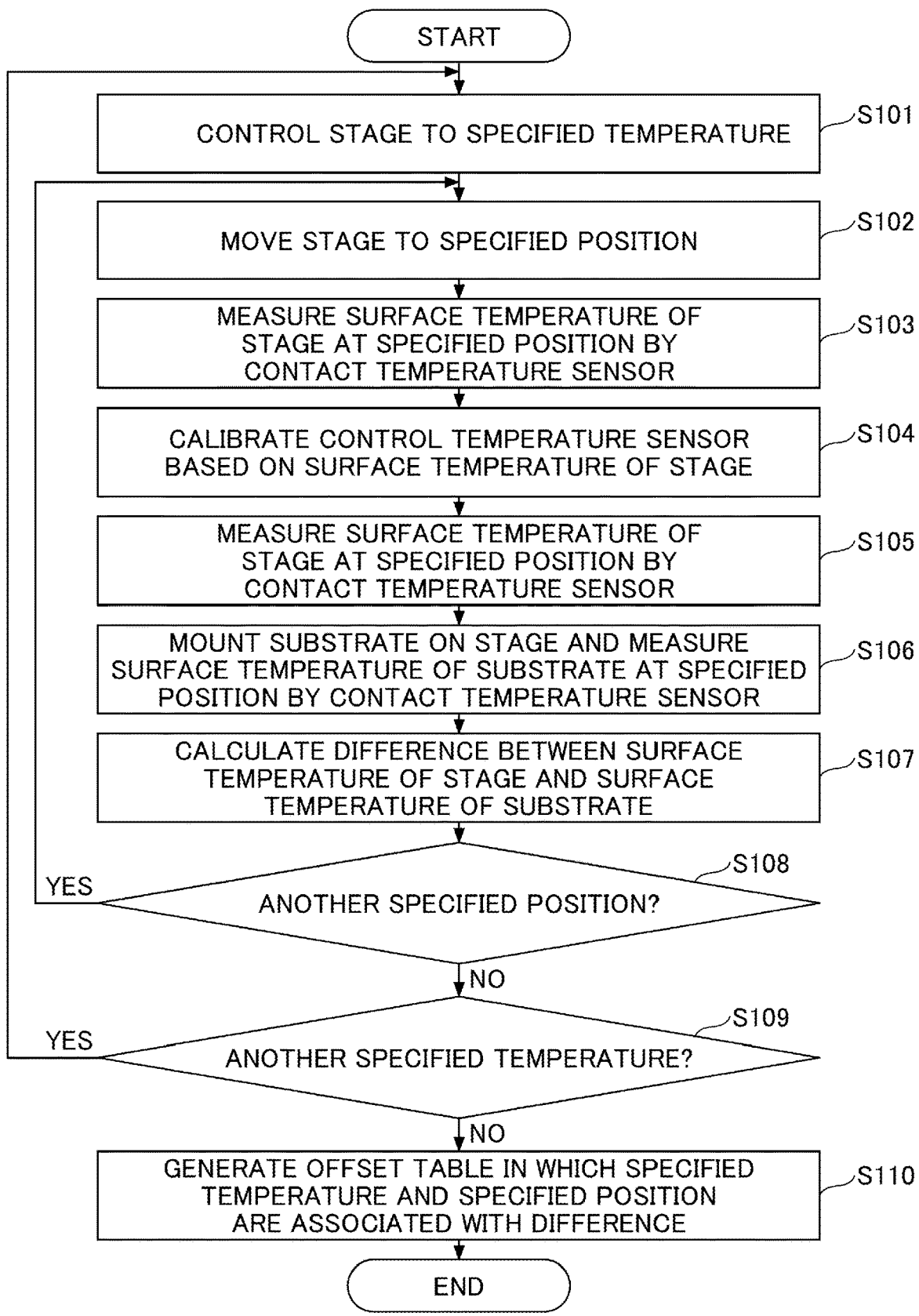
FIG. 4 is a flowchart illustrating an example of an offset table generation process.

A process of generating an offset table used when the controller 30 controls the temperature of the stage 21 (hereinafter referred to as an "offset table generation process") will be described with reference to FIGS. 4 to 6.

First, in step S101, the controller 30 controls the temperature adjustment mechanism 28 so that the control temperature of the control temperature sensor 27 becomes a specified temperature. The specified temperature is a target temperature for which the offset amount is calculated.

Figure 5A:
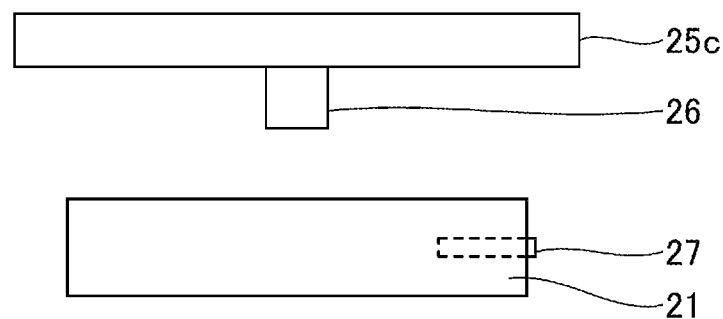
FIG. 5A is a diagram illustrating an example of the offset table generation process.

Next, in step S102, the controller 30 controls the XY stage 23 to horizontally move the stage 21 to a specified position (see FIG. 5A). The specified position is a target position for which the offset amount is calculated.

Figure 5B:
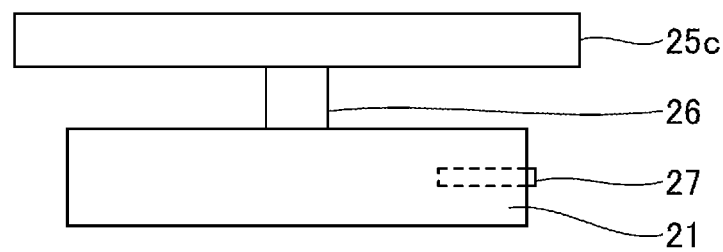
FIG. 5B is a diagram illustrating an example of the offset table generation process.
Figure 5C:
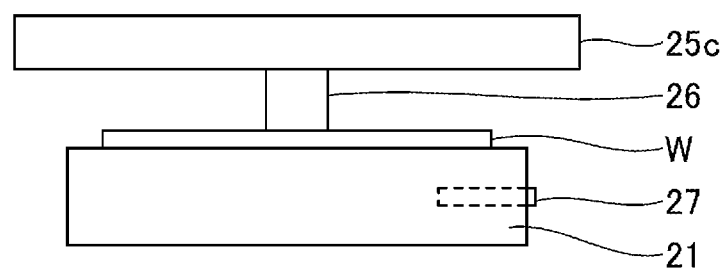
FIG. 5C is a diagram illustrating an example of the offset table generation process.

Next, in step S103, the controller 30 controls the raising/lowering mechanism 22 to move (raise) the stage 21 to a position at which the surface of the stage 21 comes into contact with the contact temperature sensor 26 (see FIG. 5B). Subsequently, the controller 30 causes the contact temperature sensor 26 to measure the surface temperature of the stage 21.

Next, in step S104, the controller 30 calibrates the control temperature sensor 27 based on the surface temperature of the stage 21 measured by the contact temperature sensor 26. For example, the controller 30 calibrates the control temperature sensor 27 so that the temperature of the control temperature sensor 27 matches the surface temperature of the stage 21 measured by the contact temperature sensor 26.

Next, in step S105, the controller 30 causes the contact temperature sensor 26 to measure the surface temperature of the stage 21 in the same manner as in step S103.

Next, in step S106, the controller 30 controls the substrate transfer mechanism 13 to transfer the substrate W onto the stage 21. Subsequently, at the specified position, the controller 30 controls the raising/lowering mechanism 22 to move (raise) the stage 21 to a position at which the surface of the substrate W mounted on the stage 21 comes into contact with the contact temperature sensor 26 (see FIG. 5C). Subsequently, the controller 30 causes the contact temperature sensor 26 to measure the surface temperature of the substrate W. The specified position is the same position as the specified position in step S102, and is the target position for which the offset amount is calculated. Here, the substrate W measured by the contact temperature sensor 26 may be a product substrate to be tested or a dummy substrate corresponding to a product, but is preferably a dummy substrate corresponding to a product.

Next, in step S107, the controller 30 calculates a difference (an offset amount) between the surface temperature of the stage 21 measured by the contact temperature sensor 26 in step S105 and the surface temperature of the substrate W measured by the contact temperature sensor 26 in step S106.

Next, in step S108, the controller 30 determines whether there is another specified position. If it is determined in step S108 that there is another specified position, the controller returns the process to step S102 and performs steps S102 to S107. That is, the controller 30 calculates a difference (an offset amount) between the surface temperature of the stage 21 and the surface temperature of the substrate W at the new specified position. If it is determined in step S108 that there is no other specified position, the controller 30 advances the process to step S109.

Next, in step S109, the controller 30 determines whether there is another specified temperature. When it is determined in step S109 that there is another specified temperature, the controller 30 returns the process to step S101 and performs steps S101 to S108. That is, the controller 30 calculates a difference (an offset amount) between the surface temperature of the stage 21 and the surface temperature of the substrate W at the new specified temperature. If it is determined in step S109 that there is no other specified temperature, the controller 30 advances the process to step S110.

Next, in step S110, the controller 30 generates an offset table in which the specified temperature and the specified position are associated with the difference (the offset amount) calculated in step S107, and stores the generated offset table. Subsequently, the process is ended.

The offset table is generated for each type of the substrate W. The type of the substrate W includes at least one of the thickness of the substrate W, a state of the back surface of the substrate W, and presence or absence of a support substrate. Because the thicknesses of the substrates W are, for example, from 750 μm to a thin film (for example, 40 μm), the thermal resistances are different, so that the offset amounts become different. Because the state of the back surface of the substrate W includes various states, such as a mirror-finished state or a grinding state after thinning the substrate, the thermal resistances are different, so that the offset amounts become different. The support substrate is a substrate used for supporting the substrate W when the substrate W to be tested is thin, for example, and because the thermal resistances are largely different between the case in which the support substrate is provided and the case in which the support substrate is not provided, the offset amounts become different. Additionally, because the support substrate includes various types of substrates, such as a glass substrate and a silicon substrate, the thermal resistances are different, so that the offset amounts become different. Therefore, by generating the offset table for each type of substrate W, the surface temperature of the substrate W can be controlled with high accuracy even when the type of substrate W is different.

FIG. 6 is a diagram illustrating an example of the offset table. In the example of FIG. 6, an offset table in which a specified temperature [ ° C.] and a specified position [X,Y] are associated with an offset amount [ ° C.] for each type of the substrate W (a substrate $W_1$, a substrate $W_2$, . . . , a substrate W m) is illustrated. For example, in the offset table of the substrate $W_1$, when the specified temperature is 85° C., the X-direction position is $X_1$, and the Y-direction position is $Y_1$, the offset amount is +1.0° C.

[Temperature Control Process]

An example of a process (hereinafter referred to as a "temperature control process") in which the controller 30 controls the temperature of the stage 21 using the offset table generated in the offset table generation process will be described in reference to FIG. 7 and FIG. 8.

First, in step S201, the controller 30 controls the substrate transfer mechanism 13 to transfer the substrate W onto the stage 21 (see FIG. 8).

Next, in step S202, the controller 30 reads an offset table corresponding to the substrate W mounted on the stage 21 from among multiple offset tables stored in the offset table generation process. Then, based on the read offset table, the controller calculates an offset amount corresponding to the test temperature and the position of the DUT to be tested. For example, when the type of substrate W is the substrate $W_1$, the test temperature is 85° C., the DUT position is $(X_1,Y_2)$, and the controller 30 stores the offset tables illustrated in FIG. 6, the controller 30 calculates the offset amount to be +1.1° C.

Additionally, when there is no offset amount of the temperature corresponding to the test temperature in the read offset table, the controller may issue an alarm or display that no offset amount is found. Alternatively, the controller 30 may calculate the offset amount of the temperature closest to the test temperature as the offset amount of the temperature corresponding to the test temperature. Alternatively, the controller 30 may calculate the offset amount of the temperature corresponding to the test temperature by interpolation, such as linear interpolation, based on the offset amounts of two or more temperatures close to the test temperature.

Similarly, when there is no offset amount of the position corresponding to the position of the DUT to be tested in the read offset table, an alarm may be issued or a message indicating that no offset amount is found may be displayed. Alternatively, the controller 30 may calculate the offset amount of the position closest to the position of the DUT to be tested as the offset amount of the position corresponding to the position of the DUT to be tested. Alternatively, the controller 30 may calculate the offset amount of the position corresponding to the position of the DUT to be tested by interpolation, such as linear interpolation, based on the offset amounts of two or more positions close to the position of the DUT to be tested.

Next, in step S203, the controller 30 controls the temperature of the stage 21 by offsetting the control temperature of the control temperature sensor 27 by the offset amount calculated in step S202.

As described above, according to the embodiment, the controller 30 controls the temperature of the stage 21 by offsetting the control temperature of the control temperature sensor 27 based on the surface temperature of the stage 21 and the surface temperature of the substrate W measured by the contact temperature sensor 26. This can control the surface temperature of the substrate W to be tested with high accuracy.

Additionally, according to the embodiment, the controller 30 generates the offset table for each type of the substrate W. This allows the temperature to be controlled in accordance with the type of the substrate W.

Additionally, according to the embodiment, the controller 30 generates the offset table in which the difference between the surface temperature of the stage 21 measured by the contact temperature sensor 26 and the surface temperature of the substrate W measured by the contact temperature sensor 26 are associated with the temperature and the position. This allows the temperature to be controlled in accordance with the test temperature and the test position.

Additionally, according to the embodiment, the controller 30 causes the same contact temperature sensor 26 to measure the surface temperature of the stage 21 and the surface temperature of the substrate W at multiple specified positions in the plane of the stage 21 (the substrate W). This can correct the in-plane temperature of the stage 21 (the substrate W) with high accuracy because there is no difference in the sensor.

Here, in the above-described embodiment, the contact temperature sensor 26 is an example of a first temperature sensor, the control temperature sensor 27 is an example of a second temperature sensor, and the controller 30 is an example of a controller.

It should be understood that the embodiments disclosed herein are illustrative in all respects and are not restrictive. The above-described embodiments may be omitted, replaced, and changed in various forms without departing from the scope and spirit of the appended claims.

In the embodiment described above, the case in which one contact temperature sensor 26 is provided has been described, but the present disclosure is not limited thereto. For example, two or more contact temperature sensors 26 may be provided. When two or more contact temperature sensor 26 are provided, the surface temperatures at multiple positions in the plane of the stage 21 and the temperatures at multiple positions in the plane of the substrate W can be measured by one time. However, from the viewpoint of ensuring high contact between the contact temperature sensor 26 and the surface of the stage 21 and between the contact temperature sensor 26 and the surface of the substrate W, the number of the contact temperature sensors 26 is preferably three or less.

In the embodiment described above, the case in which the stage 21 is moved, so that the contact temperature sensor 26 is caused to come into contact with the surface of the stage 21 and the surface of the substrate W to measure the surface temperature of the stage 21 and the surface temperature of the substrate W has been described, but the present disclosure is not limited thereto. For example, the contact temperature sensor 26 may be moved, so that the contact temperature sensor 26 is caused to come into contact with the surface of the stage 21 and the surface of the substrate W to measure the surface temperature of the stage 21 and the surface temperature of the substrate W.

In the embodiment described above, the case in which the contact temperature sensor 26 measures the surface temperature of the stage 21 and the surface temperature of the substrate W are measured has been described, but the present disclosure is not limited thereto. For example, a non-contact temperature sensor such as a radiation thermometer may measure the surface temperature of the stage 21 and the surface temperature of the substrate W.

In the embodiment described above, the case in which the controller 30 performs the offset table generation process and the temperature control process has been described, but the present disclosure is not limited thereto. For example, a temperature controller may be provided separately from the controller 30, and the temperature controller may perform at least a part of the offset table generation process and the temperature control process. Additionally, for example, a host computer connected to the test device 1 via a network may perform at least a part of the offset table generation process and the temperature control process.

In the embodiment described above, the case in which the test device 1 includes one test section 20 for one loader 10 has been described, but the present disclosure is not limited thereto. For example, the test device may be a device including multiple test sections for one loader. Additionally, for example, the test device may be a device including multiple loaders and multiple test sections.

The present international application claims priority based on Japanese Patent Application No. 2021-029656 filed on Feb. 26, 2021, the entire contents of which are incorporated herein by reference.

DESCRIPTION OF REFERENCE SYMBOLS 1 test device
21 stage
26 contact temperature sensor
27 control temperature sensor
28 temperature adjustment mechanism
30 controller
W substrate

The invention claimed is:

1. A test device comprising:
a stage configured to mount a substrate;
a first temperature sensor configured to measure a surface temperature of the stage and a temperature of the substrate mounted on the stage;
a second temperature sensor for controlling a temperature of the stage; and
a controller configured to control the temperature of the stage by offsetting a control temperature of the second temperature sensor based on a difference between the surface temperature of the stage and the temperature of the substrate that are measured by the first temperature sensor,
wherein the first temperature sensor is attached to an alignment bridge inside the test device, and
wherein the first temperature sensor is a contact temperature sensor configured to contact a surface of the stage to measure the surface temperature of the stage in a state where the substrate is not mounted on the stage and contact a surface of the substrate to measure the temperature of the substrate in a state where the substrate is mounted on the stage.

2. The test device as claimed in claim 1, wherein the stage is movable to a plurality of positions including a position where the first temperature sensor is in contact with a surface of the stage and a position where the first temperature sensor is in contact with a surface of the substrate.

3. The test device as claimed in claim 1, wherein the controller is configured to generate an offset table in which the difference is associated with a test temperature and a test position of the substrate.

4. The test device as claimed in claim 3, wherein the offset table is generated for each type of the substrate.

5. The test device as claimed in claim 4, wherein the type of the substrate includes at least one of a thickness of the substrate, a state of a back surface of the substrate, and presence or absence of a support substrate.

6. A temperature control method in a test device, comprising:
measuring a surface temperature of a stage by a first temperature sensor;

mounting a substrate on the stage and measuring a temperature of the substrate by the first temperature sensor; and controlling a temperature of the stage by offsetting a control temperature of a second temperature sensor for controlling the temperature of the stage based on a difference between the surface temperature of the stage and the temperature of the substrate that are measured by the first temperature sensor, wherein the first temperature sensor is attached to an alignment bridge inside the test device, and wherein the first temperature sensor is a contact temperature sensor configured to contact a surface of the stage to measure the surface temperature of the stage in a state where the substrate is not mounted on the stage and contact a surface of the substrate to measure the temperature of the substrate in a state where the substrate is mounted on the stage.

* * * * *